(12) United States Patent
Alarawi

(10) Patent No.: US 12,129,433 B2
(45) Date of Patent: Oct. 29, 2024

(54) WET-AIR OXIDATION OF KEROGEN IN SUBTERRANEAN FORMATIONS

(71) Applicant: Saudi Arabian Oil Company, Dhahran (SA)

(72) Inventor: Abeer Ateeq Alarawi, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/903,620

(22) Filed: Sep. 6, 2022

(65) Prior Publication Data
US 2024/0076539 A1    Mar. 7, 2024

(51) Int. Cl.
*C09K 8/592* (2006.01)

(52) U.S. Cl.
CPC .................................. *C09K 8/592* (2013.01)

(58) Field of Classification Search
CPC ...... E21B 43/24; E21B 43/248; E21B 43/006; E21B 43/281; E21B 43/16; E21B 43/166; E21B 43/168; C09K 8/594; C09K 8/592; C09K 8/58; C09K 8/60
See application file for complete search history.

(56) References Cited

U.S. PATENT DOCUMENTS

| | | | | |
|---|---|---|---|---|
| 3,409,083 A | * | 11/1968 | Prats | E21B 43/243 166/256 |
| 3,499,490 A | * | 3/1970 | Needham | E21B 43/247 166/259 |
| 4,333,529 A | * | 6/1982 | McCorquodale | E21B 43/24 166/266 |
| 4,428,828 A | * | 1/1984 | Bose | C10G 27/04 208/254 R |
| 4,458,756 A | * | 7/1984 | Clark | E21B 43/24 166/260 |
| 7,875,575 B2 | | 1/2011 | Huang et al. | |
| 8,997,869 B2 | | 4/2015 | Wigand et al. | |
| 10,781,360 B2 | | 9/2020 | Hull et al. | |
| 2003/0085034 A1 | * | 5/2003 | Wellington | E21B 36/001 166/248 |
| 2012/0160486 A1 | * | 6/2012 | Wigand | C10G 9/00 166/279 |
| 2013/0161002 A1 | * | 6/2013 | Wigand | C09K 8/592 166/279 |
| 2021/0198558 A1 | * | 7/2021 | Hull | C09K 8/68 |

FOREIGN PATENT DOCUMENTS

RU     2418944 C1  *  5/2011
WO  WO-2017161157 A1 *  9/2017

OTHER PUBLICATIONS

Translation of RU 2418944 C1 (Year: 2011).*
Kaldas et al., "Wet air oxidation of oil shales: kerogen dissolution and dicarboxlyic acid formation," ACS Omega, 2020, 5:22021-22030, 10 pages.

* cited by examiner

*Primary Examiner* — Angela M DiTrani Leff
(74) *Attorney, Agent, or Firm* — Fish & Richardson P.C.

(57) ABSTRACT

Methods and systems for treating a subterranean formation including kerogen are provided. An exemplary method includes forming a mixture including field water and oxygen, and injecting the mixture through a wellbore into the subterranean formation to oxidize at least a portion of the kerogen.

18 Claims, 4 Drawing Sheets

WET-AIR OXIDATION OF KEROGEN IN SUBTERRANEAN FORMATIONS

TECHNICAL FIELD

The present disclosure is directed to methods and systems for treating a subterranean formation including kerogen with field water-containing mixtures.

BACKGROUND

Unconventional hydrocarbon reservoirs are reservoirs with trapped hydrocarbons (for example, oil, natural gas, or combinations of them) in which the hydrocarbon mobility is limited. Extraction of hydrocarbons from such reservoirs typically involves increasing the mobility of the hydrocarbons, for example, by hydraulic fracturing. In hydraulic fracturing, a fracturing fluid (for example, proppants and one or more chemicals in an aqueous or non-aqueous base fluid) is flowed through the hydrocarbon reservoir at high pressure. The pressure of the fracturing fluid fractures the reservoir rock to increase mobility of the trapped hydrocarbons.

Some reservoirs include an organic material called kerogen intertwined with the rock matrix. Kerogen has a complex composition that can generally be represented as an aliphatic-branched macromolecule cross-linked with aromatic (usually phenolic) units and differently bonded oxygen atoms in various ratios. The composition of kerogen from different shales can differ significantly. The intertwined kerogen can drastically increase the tensile strength of the rock. As a result, a significant amount of energy can be required to propagate fractures in these reservoirs.

SUMMARY

An embodiment of the present disclosure provides a method of treating a subterranean formation including kerogen. The method includes forming a mixture including field water and oxygen, and injecting the mixture through a wellbore into the subterranean formation to oxidize at least a portion of the kerogen.

An embodiment of the present disclosure provides a system for treating a subterranean formation. The system includes a mixing unit configured to contact an aqueous stream including field water and a gaseous stream including oxygen to form a treatment stream including field water and oxygen, and a pump configured to inject the treatment stream through a wellbore into the subterranean formation.

DETAILED DESCRIPTION

The present disclosure relates to methods and systems for treating a subterranean formation including kerogen by forming an oxygen- and field water-containing mixture, and injecting the mixture through a wellbore into the subterranean formation. In particular, the operational methods and systems of the present disclosure provide a wet-air oxidation process to convert kerogen into soluble organic matter such as semi-polymeric organic material and aliphatic dicarboxylic acids. Such methods and systems can, as part of a hydraulic fracturing treatment, increase well productivity in unconventional reservoirs. Such methods and systems can also reduce costs associated with storage and/or disposal of excess field water.

Figure 1:
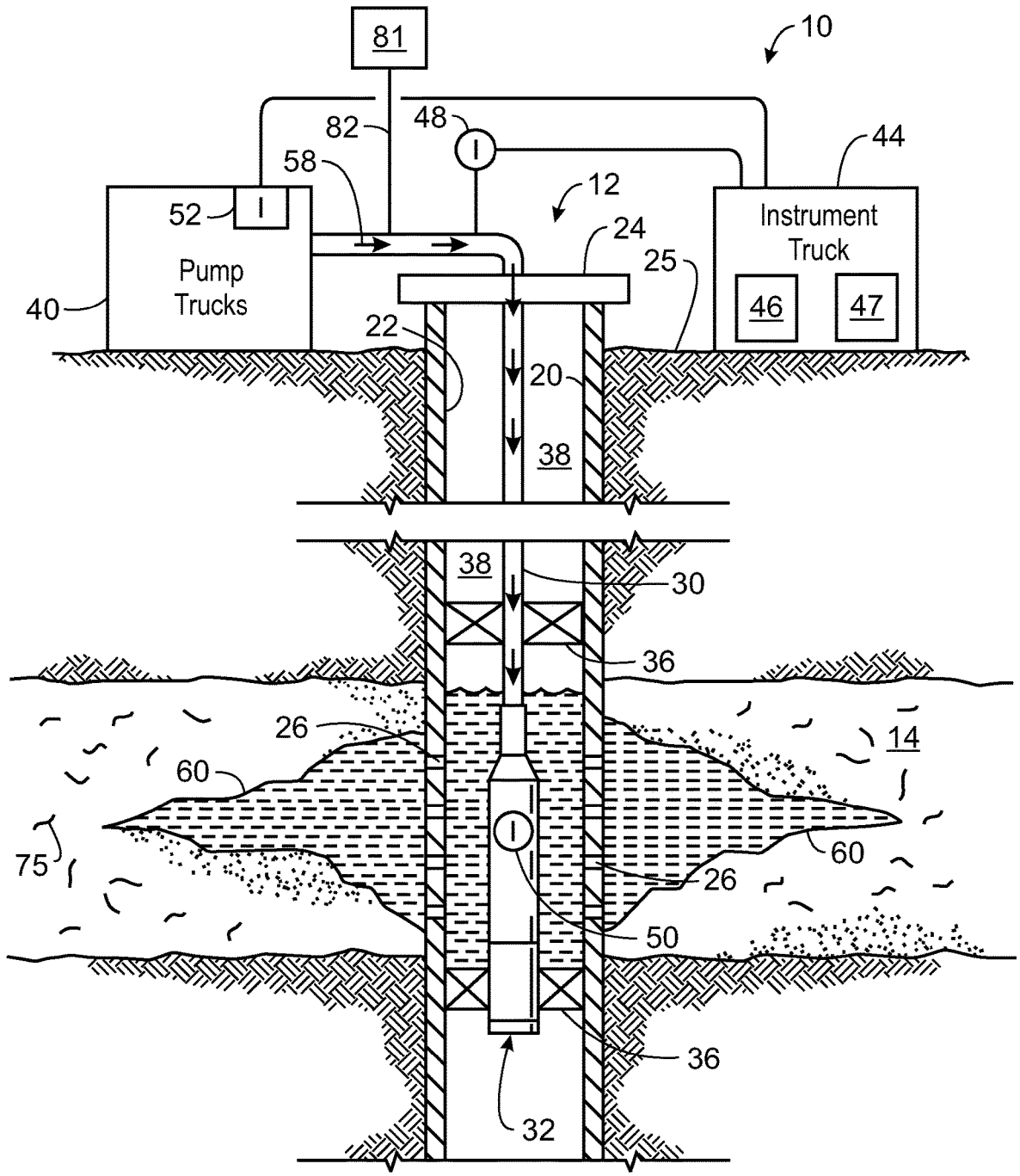
FIG. 1 is a schematic illustration of a fracture treatment.

FIG. 1 is a schematic illustration of a fracture treatment 10 for a well 12. The well 12 can be a reservoir or formation 14, for example, an unconventional reservoir in which recovery operations in addition to conventional recovery operations are practiced to recover trapped hydrocarbons. Examples of unconventional reservoirs include tight-gas sands, gas and oil shales, coalbed methane, heavy oil and tar sands, and gas-hydrate deposits. In some implementations, the formation 14 includes an underground formation of naturally fractured rock containing hydrocarbons (for example, oil, gas, or both). For example, the formation 14 can include a fractured shale. In some implementations, the well 12 can intersect other suitable types of formations 14, including reservoirs that are not naturally fractured in any significant amount.

The well 12 can include a well bore 20, casing 22 and well head 24. The well bore 20 can be a vertical or deviated bore. The casing 22 can be cemented or otherwise suitably secured in the well bore 12. Perforations 26 can be formed in the casing 22 at the level of the formation 14 to allow oil, gas, and by-products to flow into the well 12 and be produced to the surface 25. Perforations 26 can be formed using shape charges, a perforating gun or otherwise.

For the fracture treatment 10, a work string 30 can be disposed in the well bore 20. The work string 30 can be coiled tubing, sectioned pipe or other suitable tubing. A fracturing tool 32 can be coupled to an end of the work string 30. Packers 36 can seal an annulus 38 of the well bore 20 above and below the formation 14. Packers 36 can be mechanical, fluid inflatable, or other suitable packers.

One or more pump trucks 40 can be coupled to the work string 30 at the surface 25. The pump trucks 40 pump fracture fluid 58 down the work string 30 to perform the fracture treatment 10 and generate the fracture 60. The fracture fluid 58 can include a fluid pad, proppants, and/or a flush fluid. The pump trucks 40 can include mobile vehicles, equipment such as skids, or other suitable structures.

One or more instrument trucks 44 can also be provided at the surface 25. The instrument truck 44 can include a fracture control system 46 and a fracture simulator 47. The fracture control system 46 monitors and controls the fracture treatment 10. The fracture control system 46 can control the pump trucks 40 and fluid valves to stop and start the fracture treatment 10 as well as to stop and start the pad phase, proppant phase, and/or flush phase of the fracture treatment 10. The fracture control system 46 communicates with surface and/or subsurface instruments to monitor and control the fracture treatment 10. In some implementations, the surface and subsurface instruments may include surface sensors 48, downhole sensors 50, and pump controls 52.

A quantity of energy applied by the fracture control system 46 to generate the fractures 60 in the reservoir or formation 14 can be affected not only by the properties of the reservoir rock in the formation but also by the organic matter (for example, kerogen 75) intertwined within the rock matrix. The high modulus of toughness of the rock-kerogen combination compared to the rock alone can require a large quantity of energy to generate fractures in such a reservoir. Moreover, the presence of kerogen in the reservoir can affect production as well. For example, the rubber-like properties of elastomeric kerogen has a high elasticity, which can prematurely close fractures resulting in decrease in production. Accordingly, the presence of kerogen in a subterranean formation can decrease an efficiency of hydraulic fracturing treatments.

In various embodiments of the present disclosure, a system 81 can inject a mixture 82 including oxygen and field water, through wellbore 20, into the subterranean formation 14 to oxidize at least a portion of the kerogen 75 (for example, before pumping fracture fluid 58, or simultaneously with pumping fracture fluid 58). As or after the kerogen is oxidized, a quantity of energy to generate and propagate fractures in the subterranean formation (for example a reservoir) can decrease, thereby increasing an efficiency (for example, cost, time, long-term effect, etc.) of the fracturing process. In addition, fracture length and formation surface exposure after wellbore shut-in can be greater than corresponding parameters in reservoirs in which the kerogen has not been degraded. In addition, removing or partially removing the kerogen and other organic matter from the near fracture zone can decrease the propensity for the fractures to close (reheal) after the pressure is released from pumping the fracturing, thereby improving the overall productivity of the well. In certain instances, the kerogen oxidation products (which can include unbranched aliphatic acids, branched acids, dicarboxylic acids, keto acids and aromatic acids) can be recovered and serve as starting materials useful in both the chemical and materials industries.

In some instances, the field water includes excess field water. For example, the field water can be excess field water from an on-site field water handling facility. In some examples, the excess field water is stored in tanks until use. In some embodiments, the field water includes formation water, produced water, flowback water, or any combination thereof.

The mixture can be free from catalysts or other external additives. In some examples, wet air oxidation without any catalyst or external additives can convert up to about 33% of kerogen to a mixture of semipolymeric dissolved organic material and about 10% of aliphatic dicarboxylic acids.

In some embodiments, the mixture includes a second gas. The second gas can be an inert gas, such as nitrogen. In certain instances, a molar ratio of the oxygen to the second gas present in the mixture is about 1:10 to about 100:1, for example, 1:10 to about 10:1, about 1:10 to about 1:1, about 1:1 to about 100:1, about 1:1 to about 10:1, about 10:1 to about 100:1, or about 1:5, about 1:4, about 1:3, about 1:2, about 1:1, about 2:1, about 3:1, about 4:1, or about 5:1. In certain instances, the relative amount of oxygen and second gas present in the mixture can be selected to improve selectivity of the oxidation for one or more valuable products, such as aliphatic dicarboxylic acids. In some examples, increased yields of aliphatic dicarboxylic acids are obtained for a mixture including oxygen and the second gas in a molar ratio of about 1:1. Such mixtures can be formed, for example, by adding oxygen gas and the second gas, separately or in combination, to field water.

In some embodiments, the mixture further includes an acid or a base. Examples of suitable acids include mineral acids such as HCl, as well as organic acids such as acetic acid. Examples of suitable bases include carbonates such as $Na_2CO_3$ and $K_2CO_3$; hydroxides such as $Ca(OH)_2$, NaOH, and KOH; and silicates such as $Na_2SiO_3$. In certain instances, the base includes an ash, for example, fly ash and the like from an electrostatic precipitator (ESP). Mixtures including such additives can be formed, for example, by adding the acid or the base to the field water, for example, before or after, or simultaneously with the oxygen gas.

In some examples, wet air oxidation with mixtures including such additives (for example, KOH, $K_2CO_3$ and ESP ash) can convert up to about 52% of kerogen to dissolved organics after only one hour of treatment. In some examples, basic conditions can increase the yield of dissolved organics and decrease the yield of $CO_2$, as compared to wet-air oxidation under neutral conditions. In other examples, acidic conditions can increase the yield of aliphatic dicarboxylic acids, as compared to wet-air oxidation under neutral conditions.

In some embodiments, a temperature of the mixture is about 125° C. to about 200° C. In various examples, the temperature of the mixture can be about 125° C. to about 190° C., about 125° C. to about 180° C., about 140° C. to about 200° C., about 140° C. to about 190° C., about 140° C. to about 180° C., about 150° C. to about 200° C., about 150° C. to about 190° C., or about 150° C. to about 180° C. In certain instances, the temperature of the mixture is about 150° C., about 155° C., about 160° C., about 165° C., about 170° C., about 175° C., about 180° C., about 185° C., or about 190° C. In some examples, higher temperatures (for example, greater than about 165° C.) can increase the rate of kerogen oxidation. In other examples, lower temperatures (for example, about 150° C. to about 165° C.) can increase the yield of oxidation products such as aliphatic dicarboxylic acids.

In some embodiments, a pressure of the mixture is about 20 bar to about 60 bar. In various examples, the pressure of the mixture is about 20 bar to about 50 bar, about 20 bar to about 45 bar, about 30 bar to about 60 bar, about 30 bar to about 50 bar, about 30 bar to about 45 bar, about 35 bar to about 60 bar, about 35 bar to about 50 bar, or about 35 bar to about 45 bar. In certain instances, the pressure of the mixture is about 30 bar, about 35 bar, about 40 bar, about 45 bar, or about 50 bar. In some examples, higher pressures can increase the rate of kerogen oxidation (for example, to aliphatic dicarboxylic acid). In other examples, secondary reactions (for example, degradation of aliphatic dicarboxylic acids) can occur at higher pressures (for example, greater than about 40 bar).

Figure 2:
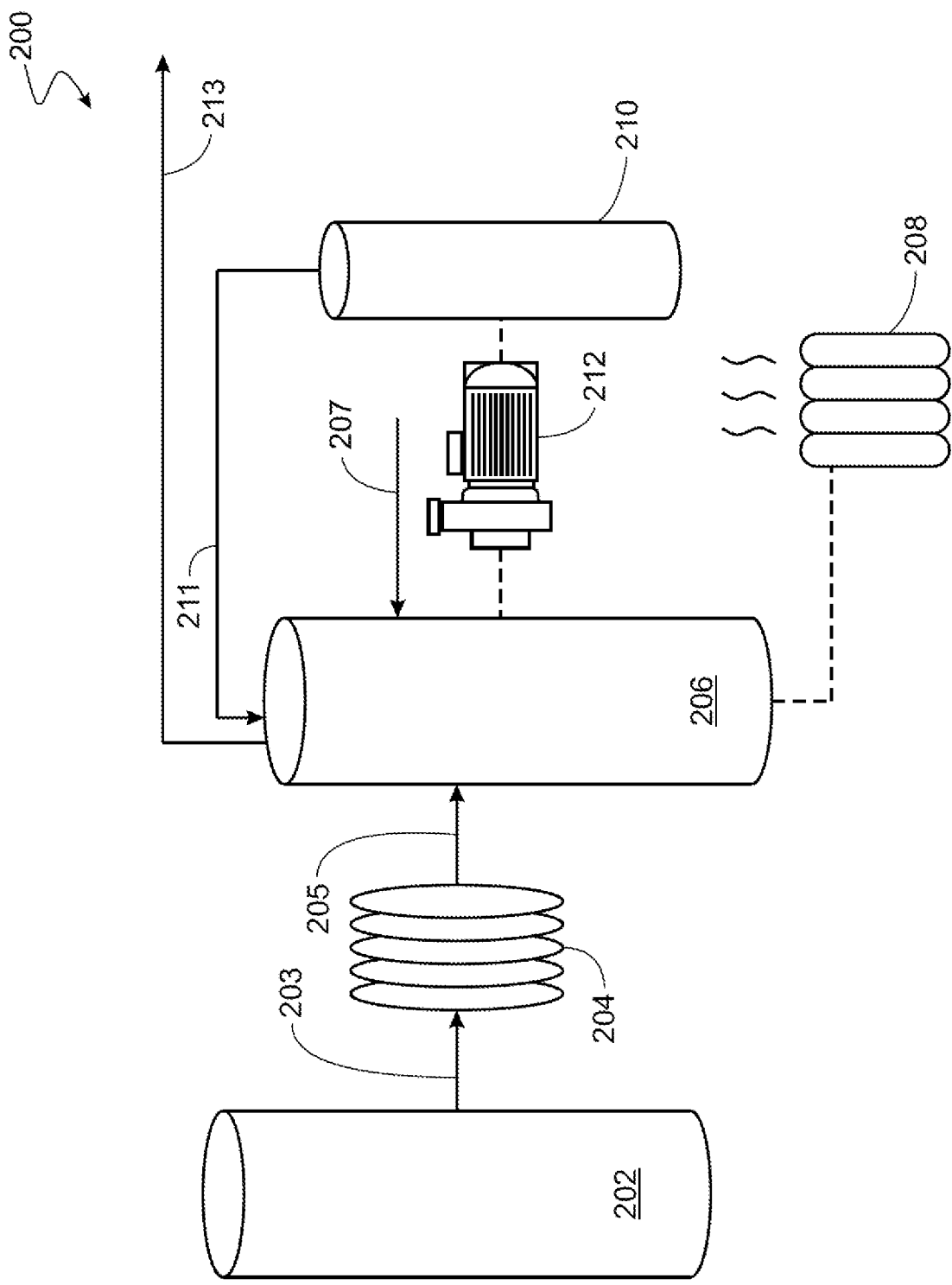
FIG. 2 is a schematic illustration of a system for treating a subterranean formation including kerogen.

FIG. 2 is a schematic illustration of a system 200 for treating a subterranean formation in accordance with certain embodiments of the present disclosure. The system 200 includes a field water storage unit 202, a treatment unit 204, a mixing unit 206, a heating unit 208, a gas storage unit 210, and a pump 212.

Aqueous stream 203 including field water from storage unit 202 is directed to the treatment unit 204. In some embodiments, the treatment unit is configured to filter the field water, for example, by membrane filtration. Other treatment technologies suitable for field water, such as nanotechnology purification, distillation, acoustic nanotube purification, photocatalytic purification, chemical treatments such as chlorination, and the like can also be used to treat the aqueous stream.

In some embodiments, treating the field water reduces a total dissolved solids content of the field water. For example, the treatment can reduce the total dissolved solids content of the field water to about 500 mg/L to about 10,000 mg/L, to about 500 mg/L to about 7,500 mg/L, about 500 mg/L to about 5,000 mg/L, about 1,000 mg/L to about 10,000 mg/L, about 1,000 mg/L to about 7,500 mg/L, about 1,000 mg/L to about 5,000 mg/L, about 2,000 mg/L to about 10,000 mg/L, about 2,000 mg/L to about 7,500 mg/L, or about 2,000 mg/L to about 5,000 mg/L. In certain instances, reduced total solids content can mitigate operational problems such as equipment corrosion, scale formation, emulsion formation, etc.

In some embodiments, treating the field water reduces a total salt content of the field water. For example, the treatment can reduce the salt content of the field water to about 0 wt. % to about 20 wt. %, about 0 wt. % to about 15 wt. %, about 0 wt. % to about 10 wt. %, about 2.5 wt. % to about 20 wt. %, about 2.5 wt. % to about 15 wt. %, about 2.5 wt. % to about 10 wt. %, about 5 wt. % to about 20 wt. %, about 5 wt. % to about 15 wt. %, or about 5 wt. % to about 10 wt. %. In certain instances, reduced salt content can mitigate operational problems such as equipment corrosion, scale formation, emulsion formation, etc.

Aqueous stream 205 including treated field water, gaseous stream 211 including oxygen, and additive stream 207 including an acid or a base are directed to the mixing unit 206. The pressure and/or flow rate of streams 205, 211, and 207 can each individually be controlled, for example, by flow control valves, variable liquid pumps, and the like. The field water from stream 205, oxygen from stream 211, and acid or base from stream 207 are mixed to form treatment stream 213 including a mixture of oxygen, field water, and acid or base. The mixing unit can be any suitable mixer or reactor, for example, a reactor including a gas entrainment impeller. Other suitable entrainment technologies (for example, turbine stirrers) are known to the person skilled in the art.

For example, in some embodiments, the mixing unit includes a static mixer. Static mixers have no moving parts, and instead rely on external pumps to move fluids through the mixer. Static mixers can include an array of elements (for example, conduits, plates, or baffles) within the device to divide, recombine, spread, rotate, eddy, or swirl fluids pumped through the static mixer.

In another example, in some embodiments, the mixing unit includes an inline high shear mixer. The inline high shear mixer can include a rotor/stator assembly installed within a housing having inlet and outlet connections. The rotor can be connected to a shaft that is directly drive or belt driven by a motor. A mechanical seal can be utilized on the rotating shaft to isolate the mixing chamber from the environment. In certain such examples, interchangeable stators can provide flexibility to adapt to particular streams and compositions.

Mixing unit 206 is in thermal communication with heating unit 208, which can modulate a temperature of the treatment stream 213 (for example, to a temperature of about 125° C. to about 200° C.). Suitable heating units, such as a heating oven, are known to the person skilled in the art. Mixing unit 206 and/or gas storage unit 210 are in fluid communication with pump 212, which can be configured in any manner suitable to inject the treatment stream 213 through a wellbore into a subterranean formation (not shown). Suitable pumps are known to the person skilled in the art. For example, the pump can include a pump truck.

In certain embodiments, gas storage unit 210 is configured to form a gaseous stream including oxygen gas and a second gas. For example, the gas storage unit can include an oxygen storage tank, a second gas storage tank, and a gas mixing valve configured to control a ratio of oxygen to the second gas present in the gaseous stream. In other instances, the gas storage unit can provide the gaseous stream from a single storage tank including a mixture of oxygen and the second gas.

The treatment of the present disclosure can be monitored by various means. For example, a downhole temperature sensor can indicate a starting time of kerogen oxidation. In another example, surface sensors can analyze the contents of evolved gases (for example, by gas chromatography) or the pH of flowback water to indicate the progress of kerogen oxidation.

Figure 3:
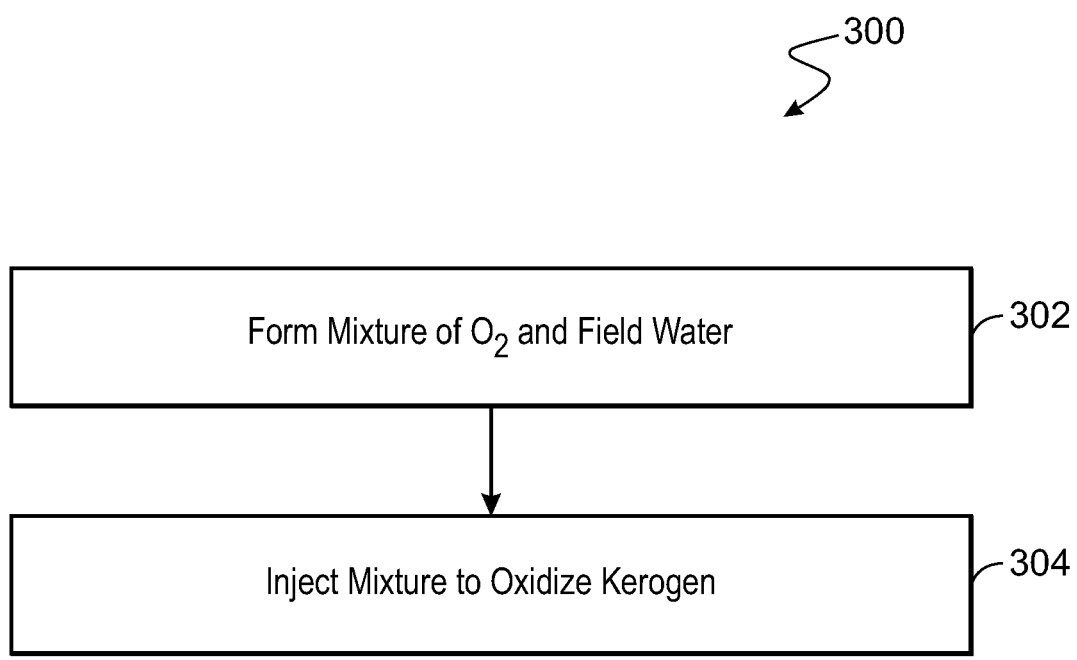
FIG. 3 is a process flow diagram of a method for treating a subterranean formation including kerogen.

FIG. 3 is a process flow diagram of a method 300 for treating a subterranean formation including kerogen. The method starts at block 302 with the formation of an oxygen- and field water-containing mixture. At block 304 of the method, the mixture is injected through a wellbore into the subterranean formation to oxidize at least a portion of the kerogen.

Figure 4:
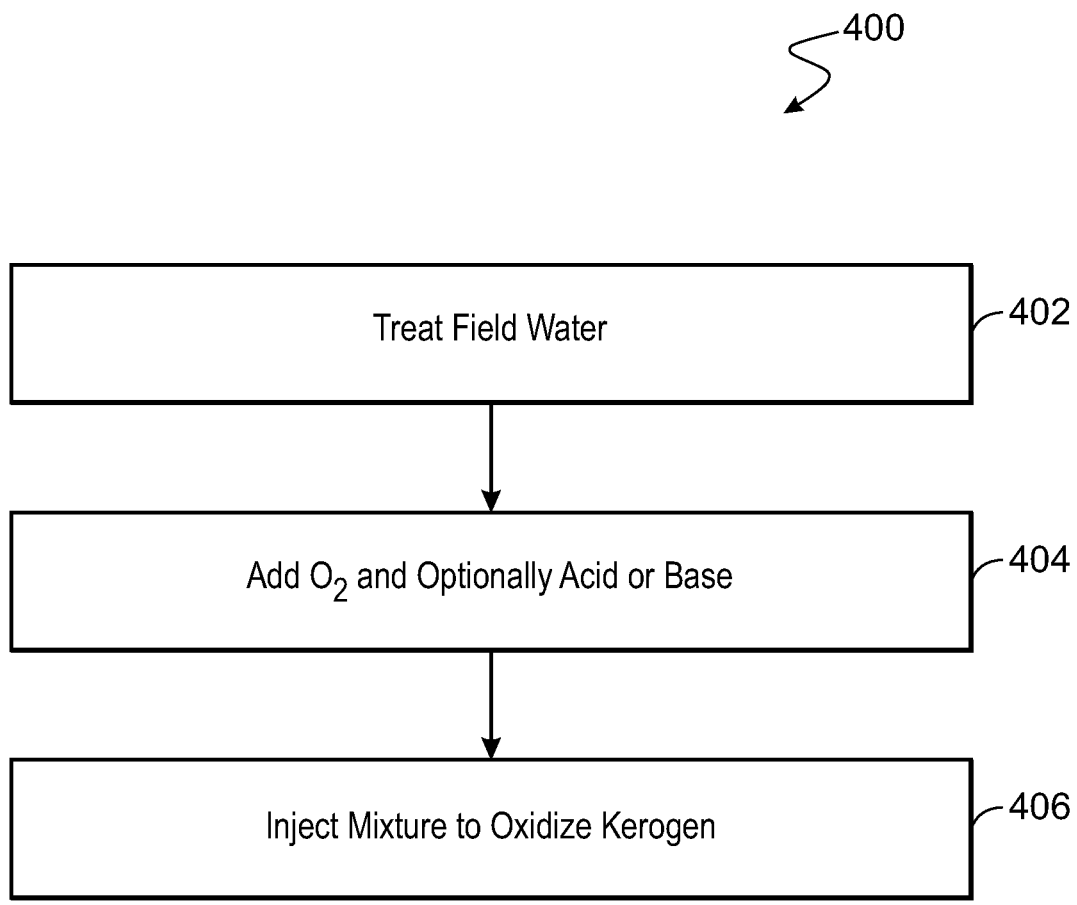
FIG. 4 is a process flow diagram of a method for treating a subterranean formation including kerogen.

FIG. 4 is a process flow diagram of a method for treating a subterranean formation including kerogen. The method starts at block 402 with the treatment of field water. At block 404, oxygen gas and, optionally, an acid or a base are added to the treated field water to form a mixture including oxygen, field water, and optionally, the acid or the base. At block 406, the mixture is injected through a wellbore into the subterranean formation to oxidize at least a portion of the kerogen.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "downhole" as used in this disclosure refers to under the surface of the earth, such as a location within or fluidly connected to a wellbore.

As used in this disclosure, the term "field water" refers to any water or water-containing fluid generated in connection with an oilfield operation. For example, "field water" can refer to formation water, produced water, flowback water, as well as other excess water-containing fluids recovered on-site.

As used in this disclosure, the term "fracturing fluid" refers to fluids or slurries used downhole during fracturing operations.

As used in this disclosure, the term "fluid" refers to liquids and gels, unless otherwise indicated.

As used in this disclosure, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Injecting a material in a subterranean formation can include contacting the material with any section of a wellbore or with any subterranean region in fluid contact therewith. Subterranean materials can include any materials placed into the wellbore such as cement, drill shafts, liners, tubing, casing, or screens; injecting a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean formation" can include any activity directed to extraction of water or petroleum materials from a subterranean petroleum- or water-producing formation or region, for example, including drilling, stimulation, hydraulic fracturing, cleanup, acidizing, completion, cementing, remedial treatment, abandonment, aquifer remediation, identifying oil rich regions via imaging techniques, and the like.

Embodiments

An embodiment of the present disclosure provides a method of treating a subterranean formation including kerogen. The method includes forming a mixture including field water and oxygen, and injecting the mixture through a wellbore into the subterranean formation to oxidize at least a portion of the kerogen. In an aspect, the field water includes formation water, produced water, flowback water, or any combination thereof.

In an aspect, the mixture further includes an acid or a base. In an aspect, the mixture includes about 20 wt. % to about 80 wt. % of the acid or the base. In an aspect, the base includes an ash. In an aspect, the base includes $Na_2CO_3$, $Ca(OH)_2$, $Na_2SiO_3$, NaOH, KOH, $K_2CO_3$, or any combination thereof. In an aspect, the acid includes HCl, acetic acid, or any combination thereof.

In an aspect, a temperature of the mixture is about 125° C. to about 200° C. In an aspect, a pressure of the mixture is about 20 bar to about 60 bar. In an aspect, the injecting includes pumping the mixture into the subterranean formation.

In an aspect, forming the mixture includes adding oxygen gas and, optionally, an acid or a base, to field water. In an aspect, forming the mixture further includes adding a second gas to the field water. In an aspect, the second gas includes an inert gas. In an aspect, a molar ratio of the oxygen gas and the second gas present in the mixture is about 1:10 to about 100:1.

In an aspect, the field water is treated before adding the oxygen gas. In an aspect, treating the field water includes filtering the field water, distilling the field water, chemically treating the field water, or any combination thereof. In an aspect, treating the field water reduces a total dissolved solids content of the field water to about 500 mg/L to about 10,000 mg/L. In an aspect, treating the field water reduces a salt content of the field water to about 0 wt. % to about 20 wt. %.

An embodiment of the present disclosure provides a system for treating a subterranean formation. The system includes a mixing unit configured to contact an aqueous stream including field water and a gaseous stream including oxygen to form a treatment stream including field water and oxygen, and a pump configured to inject the treatment stream through a wellbore into the subterranean formation. In an aspect, the mixing unit is further configured to contact an additive stream including an acid or a base, and the treatment stream further includes the acid or the base.

In an aspect, the system further includes a storage unit configured to store field water, and a treatment unit configured to treat field water from the storage unit to form the aqueous stream. In an aspect, the system further includes a gas storage unit configured to form the gaseous stream. In an aspect, the system further includes a heating unit configured to heat the mixing unit. In an aspect, the mixing unit includes a gas entrainment impeller, a static mixer, or an inline high shear mixer.

Other implementations are also within the scope of the following claims.

What is claimed is:

1. A method of treating a subterranean formation comprising kerogen, the method comprising:
   forming a mixture comprising field water and oxygen, wherein forming the mixture comprises adding oxygen gas ($O_2$) to field water; and
   injecting the mixture through a wellbore into the subterranean formation to oxidize at least a portion of the kerogen with the oxygen gas ($O_2$),
   wherein the oxidizing at least a portion of the kerogen consists of wet-air oxidation.

2. The method of claim 1, wherein the field water comprises formation water, produced water, flowback water, or any combination thereof.

3. The method of claim 1, wherein the mixture further comprises an acid or a base.

4. The method of claim 3, wherein the mixture comprises about 20 wt. % to about 80 wt. % of the acid or the base.

5. The method of claim 3, wherein the mixture comprises the base, and wherein the base comprises an ash.

6. The method of claim 3, wherein the mixture comprises the base, and wherein the base comprises $Na_2CO_3$, $Ca(OH)_2$, $Na_2SiO_3$, NaOH, KOH, $K_2CO_3$, or any combination thereof.

7. The method of claim 3, wherein the mixture comprises the acid, and wherein the acid comprises HCl, acetic acid, or any combination thereof.

8. The method of claim 1, wherein a temperature of the mixture is about 125° C. to about 200° C.

9. The method of claim 1, wherein a pressure of the mixture is about 20 bar to about 60 bar.

10. The method of claim 1, wherein the injecting comprises pumping the mixture into the subterranean formation.

11. The method of claim 1, wherein forming the mixture comprises adding an acid or a base to the field water.

12. The method of claim 11, wherein forming the mixture further comprises adding nitrogen to the field water.

13. The method of claim 12, wherein a molar ratio of the oxygen gas ($O_2$) and the nitrogen gas ($N_2$) present in the mixture is about 1:10 to about 100:1.

14. The method of claim 11, further comprising treating the field water before adding the oxygen gas ($O_2$).

15. The method of claim 14, wherein the treating comprises filtering the field water, distilling the field water, chemically treating the field water, or any combination thereof.

16. The method of claim 14, wherein the treating reduces a total dissolved solids content of the field water to about 500 mg/L to about 10,000 mg/L.

17. The method of claim 14, wherein the treating reduces a salt content of the field water to about 0 wt. % to about 20 wt. %.

18. A method of treating a subterranean formation comprising kerogen, the method comprising:

forming a mixture comprising field water and oxygen, wherein forming the mixture comprises adding oxygen gas ($O_2$) to field water; and injecting the mixture through a wellbore into the subterranean formation to oxidize at least a portion of the kerogen with the oxygen gas ($O_2$), wherein the mixture is free from catalysts and external additives.

* * * * *